United States Patent
Bressan et al.

(10) Patent No.: US 9,495,701 B2
(45) Date of Patent: Nov. 15, 2016

(54) RETAIL VENUE ORDERING SYSTEM AND METHOD

(75) Inventors: Dominic Robert Bressan, Surry Hills (AU); Stefan Williams, Surry Hills (AU)

(73) Assignee: AirService Digital Pty Ltd (AU)

( * ) Notice: Subject to any disclaimer, the term of this patent is extended or adjusted under 35 U.S.C. 154(b) by 0 days.

(21) Appl. No.: 14/009,965

(22) PCT Filed: Apr. 3, 2012

(86) PCT No.: PCT/AU2012/000336
§ 371 (c)(1),
(2), (4) Date: Nov. 6, 2013

(87) PCT Pub. No.: WO2012/135896
PCT Pub. Date: Oct. 11, 2012

(65) Prior Publication Data
US 2014/0052551 A1    Feb. 20, 2014

(30) Foreign Application Priority Data

Apr. 5, 2011 (AU) ............................... 2011901252

(51) Int. Cl.
*G06Q 30/00* (2012.01)
*G06Q 50/00* (2012.01)
(Continued)

(52) U.S. Cl.
CPC .......... *G06Q 30/0641* (2013.01); *G06Q 30/06* (2013.01); *G06Q 50/12* (2013.01)

(58) Field of Classification Search
CPC ...... G06Q 30/00; G06Q 40/00; G06Q 20/20; G06Q 30/02–30/06; G08B 1/08; G08B 5/22; G06F 17/00; G06F 17/3089; G06F 3/048; G06F 3/12

USPC .......... 705/15, 26.1, 26.81, 40, 14.58–14.61, 705/17, 24, 44, 5, 14.36, 14.1, 65, 7.13, 1.1, 705/7.32–7.35, 14.27, 26.61, 39; 340/10.51, 539.13; 455/414.2

See application file for complete search history.

(56) References Cited

U.S. PATENT DOCUMENTS

| | | | |
|---|---|---|---|
| 6,529,880 B1 * | 3/2003 | McKeen | G06Q 20/02 705/17 |
| 6,748,426 B1 * | 6/2004 | Shaffer | G06Q 10/08 704/E15.047 |

(Continued)

FOREIGN PATENT DOCUMENTS

WO    2007041672 A2    4/2007

OTHER PUBLICATIONS

Australian Patent Office, International Search Report prepared for International Application No. PCT/AU2012/000336, mailed Jun. 1, 2012.

*Primary Examiner* — Olusegun Goyea
(74) *Attorney, Agent, or Firm* — Design IP

(57) ABSTRACT

A system for decentralized ordering of goods and/or services such as food and/or drinks at a venue such as a hotel or restaurant is disclosed. The venue uploads a venue menu to an internet site via the venue's data device or computer. An order application is downloaded by prospective customers from the internet site to the mobile data device of each customer. In addition, the venue allocates a customer identification code to each customer which is stored in the customer's mobile data device. Therefore the customer can use his mobile data device to access the venue's menu and order items from the menu. Preferably the customer notifies his location within the venue and the order is delivered to the customer's location.

20 Claims, 3 Drawing Sheets

(51) Int. Cl.
  *G06Q 20/00* (2012.01)
  *G06Q 30/06* (2012.01)
  *G06Q 50/12* (2012.01)

(56) References Cited

U.S. PATENT DOCUMENTS

| | | | | |
|---|---|---|---|---|
| 7,287,009 | B1* | 10/2007 | Liebermann | G06Q 20/06 705/35 |
| 7,945,477 | B2* | 5/2011 | Werbitt | G06Q 20/20 340/426.19 |
| 8,732,028 | B2* | 5/2014 | Napper | G06Q 10/08 705/26.1 |
| 2003/0125963 | A1* | 7/2003 | Haken | G06Q 10/08 705/26.1 |
| 2004/0030658 | A1* | 2/2004 | Cruz | G06Q 20/045 705/65 |
| 2004/0044627 | A1* | 3/2004 | Russell | G06Q 20/00 705/50 |
| 2004/0158494 | A1* | 8/2004 | Suthar | G06Q 50/12 705/15 |
| 2004/0226775 | A1* | 11/2004 | Takatama | G06Q 30/06 186/53 |
| 2005/0075115 | A1* | 4/2005 | Corneille | G06F 8/61 455/456.3 |
| 2005/0102188 | A1* | 5/2005 | Hutchison | G06Q 20/02 705/39 |
| 2005/0273345 | A1* | 12/2005 | Castillejo Romero | G06Q 50/12 705/15 |
| 2006/0178943 | A1* | 8/2006 | Rollinson | G06Q 30/0601 705/26.1 |
| 2006/0232398 | A1* | 10/2006 | Nedblake | G08B 13/1427 340/539.13 |
| 2007/0088624 | A1* | 4/2007 | Vaughn | G06Q 30/02 705/15 |
| 2007/0150375 | A1* | 6/2007 | Yang | G06Q 10/08 705/339 |
| 2007/0250355 | A1* | 10/2007 | Leet | G06Q 10/02 705/5 |
| 2007/0257774 | A1* | 11/2007 | Stumpert | G06Q 10/08 340/7.1 |
| 2008/0040172 | A1* | 2/2008 | Watkins | G06Q 10/02 705/5 |
| 2008/0046331 | A1* | 2/2008 | Rand | G06Q 30/00 705/26.81 |
| 2008/0091614 | A1* | 4/2008 | Bas Bayod | G06Q 20/04 705/71 |
| 2008/0140509 | A1* | 6/2008 | Amjadi | G06Q 30/02 705/14.1 |
| 2008/0177667 | A1* | 7/2008 | Weinberg | G06Q 20/382 705/64 |
| 2009/0031258 | A1* | 1/2009 | Arrasvuori | G06F 3/017 715/863 |
| 2009/0055266 | A1* | 2/2009 | Brody | G06Q 30/0264 705/14.61 |
| 2009/0119183 | A1* | 5/2009 | Azimi | G06Q 20/102 705/26.1 |
| 2009/0167553 | A1* | 7/2009 | Hong | G06Q 10/02 340/4.61 |
| 2009/0192898 | A1* | 7/2009 | Baril | G06Q 20/204 705/14.64 |
| 2009/0228325 | A1* | 9/2009 | Simmons | G06Q 10/06313 705/7.23 |
| 2009/0292585 | A1* | 11/2009 | Seo | G06Q 10/087 705/14.58 |
| 2010/0010918 | A1* | 1/2010 | Hunt | G06Q 20/102 705/26.1 |
| 2010/0161432 | A1* | 6/2010 | Kumanov | G06Q 20/102 705/15 |
| 2011/0022946 | A1* | 1/2011 | Gupta | G06F 17/3089 715/234 |
| 2011/0047023 | A1* | 2/2011 | Lieblang | G06Q 30/02 705/14.36 |
| 2011/0093302 | A1* | 4/2011 | Hernandez | G06Q 10/02 705/5 |
| 2011/0173041 | A1* | 7/2011 | Breitenbach | G06Q 10/06311 705/7.13 |
| 2011/0191194 | A1* | 8/2011 | Lutnick | G06Q 30/0641 705/15 |
| 2011/0213678 | A1* | 9/2011 | Chorney | G06Q 30/06 705/26.61 |
| 2011/0231266 | A1* | 9/2011 | Baril | G06Q 20/204 705/15 |
| 2011/0238454 | A1* | 9/2011 | Nestor | G06Q 10/02 705/5 |
| 2012/0078731 | A1* | 3/2012 | Linevsky | G06Q 30/0277 705/14.73 |
| 2012/0101900 | A1* | 4/2012 | Milatz | G06Q 30/0257 705/14.55 |

* cited by examiner

RETAIL VENUE ORDERING SYSTEM AND METHOD

FIELD OF THE INVENTION

The present invention relates to an ordering system and method for a retail establishment such that those which sell food and drink to their customers. Such retail establishments include bars, hotels, resorts, restaurants, and the like.

BACKGROUND ART

The traditional method of ordering food and drink in a restaurant or diner is that the customer sits at a location such as a table (that may well be numbered to facilitate identification of a table) and the order is taken by a waiter or waitress. When the order is ready to be filled, the waiter or waitress then delivers the food to the table.

In a modification of this technique, it is known to take orders at a central location and an ordering customer after having ordered is then given a table number which is displayed on the table that the customer then selects. The order when completed is bought by a waiter or waitress to the customer's indicated table.

In an effort to reduce the number of waiting staff, it is also known to take orders at a central location and to provide the ordering customer with a radio device which the customer then takes with him to the table. On completion of the order, the radio device is activated and the customer then returns to the central location, returns the radio device, and collects the meal.

It is also known for some home delivery food orders, such as pizzas sold by PIZZA HUT (Registered Trade Mark), to provide an Internet based service in which customers order and pay for their food utilizing a credit card. The order is then relayed to the nearest PIZZA HUT branch which then fills the order and makes the necessary delivery.

GENESIS OF THE INVENTION

The genesis of the present invention is a desire to utilize the current proliferation of personal mobile data devices such as smart telephones to assist in the ordering of food and/or drinks.

SUMMARY OF THE INVENTION

In accordance with a first aspect of the present invention there is disclosed a method of placing orders at a retail venue having a plurality of customers each of whom has a mobile data device, said method comprising the steps of
(i) said venue uploading a venue menu to an Internet site via a data device of said venue;
(ii) downloading en order application from said site to the mobile data devices of said customers;
(iii) allocating a customer identification code by said venue to each said customer and storing said code in said mobile data device of the corresponding customer; and
(iv) a customer allocated a corresponding one of said customer identification codes accessing said menu via his mobile data device, and ordering one or more items from said menu.

In accordance with a second aspect of the present invention there is disclosed a system for placing orders at a retail venue having a plurality of customers each of whom has a mobile data device, said system comprising a venue menu uploaded from a data device of said venue to an Internet site, an order application downloaded from said site to the mobile data devices of said customers, and a customer identification code allocated by said venue to each said customer and stored in said mobile data device of the corresponding customer; said order application being such that a customer can utilize his mobile data device to access said menu, and his stored said code, to order one or more items from said menu.

BRIEF DESCRIPTION OF THE DRAWINGS

A preferred embodiment of the invention will now be described, with reference to the accompanying drawings in which.

DETAILED DESCRIPTION

Figure 1:
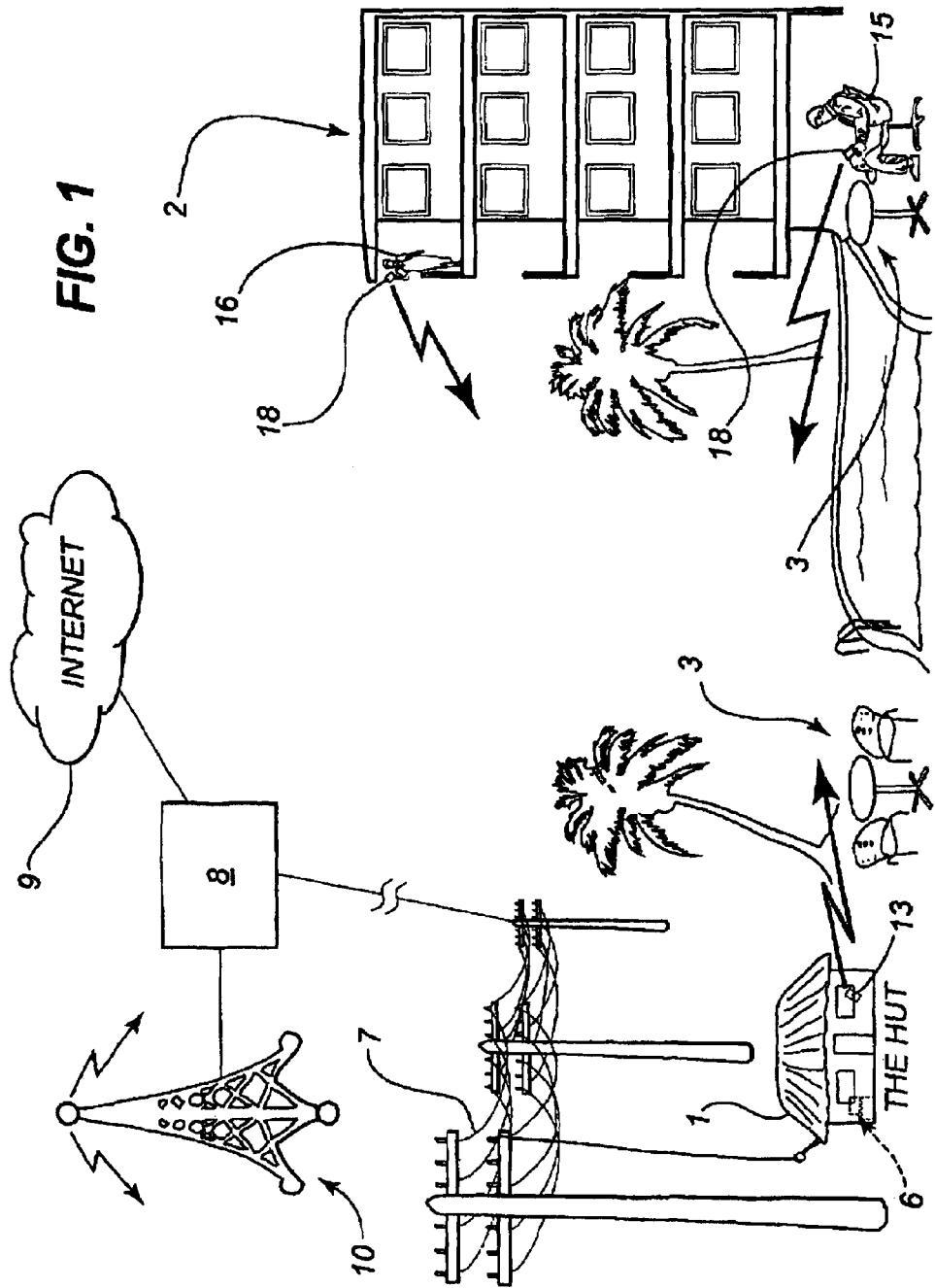
FIG. 1 is a schematic view of a retail establishment.

As seen in FIG. 1, a venue 1 takes the form of a restaurant trading under the name THE HUT and being part of a hotel 2 providing accommodation. The venue 1 has tables 3 adjacent a swimming pool.

The venue 1 includes a conventional computer 6 only part of which is visible through a window of the venue 1 and the remainder of which is illustrated in phantom in FIG. 1. The computer 6 is connected via telephone lines 7 (or via mobile telephony) to a host computer 8 which is connected to the internet 9 and to the mobile telephone system 10.

Figure 2:
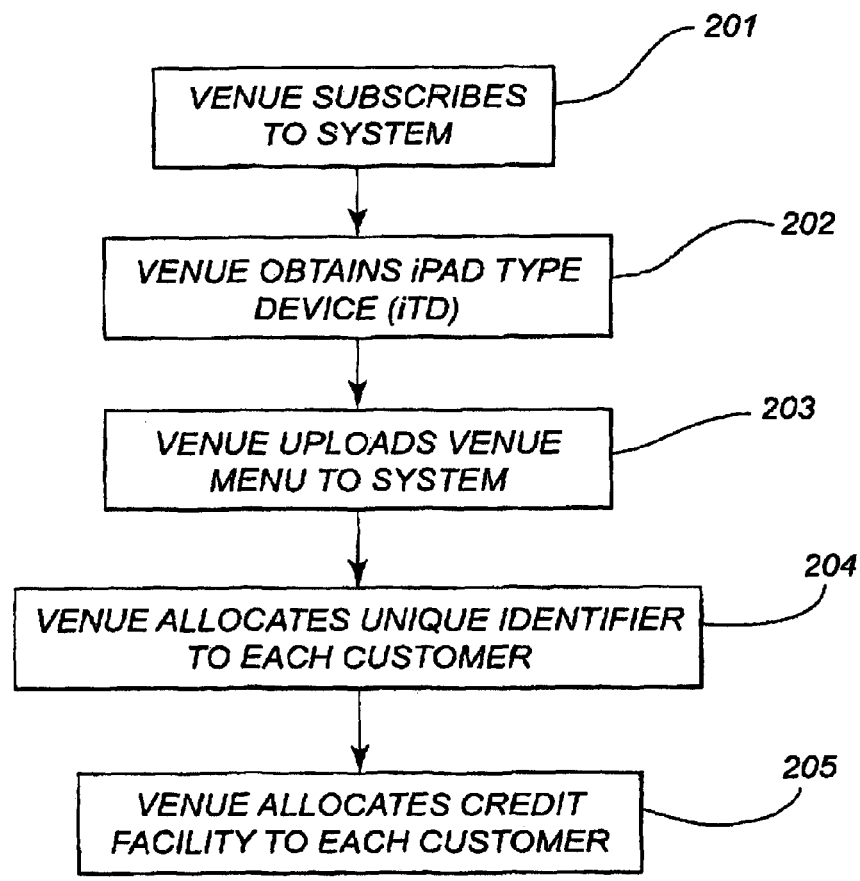
FIG. 2 is a flow chart illustrating a series of steps undertaken by a venue.

Turning now to FIG. 2, the venue 1 first of alt as indicated in step 201 subscribes to the retail ordering system which is provided by a vendor, not illustrated, but which has access to the host computer 8 and maintains a website on the Internet. Having subscribed to the system operated by the vendor, the venue 1 then as indicated in step 202, either receives an iPAD type device (iTD) 13 (FIG. 1) from the vendor, or utilizes an existing iPAD type device 13 of the vendor. iPAD is a Registered Trade Mark. (Alternatively, the venue may have an existing iPAD which it would prefer to use). The venue 1 then, as indicated at step 203 uploads a menu (or Bill of Fare), also not illustrated, which indicates the various items for sale by the venue 1 and the price of each item. The iPAD type device 13 is maintained at, or in the vicinity of, the venue 1.

The venue downloads from the vendor via the Internet an iTD application which is preferably known by the trade mark AIRSERVICE.

The venue 1 has a number of customers such as 15 and 16 (FIG. 1) each of which have their own mobile data device 18 such as a smart phone such as one of those sold under the Registered Trade Marks iPHONE, BLACKBERRY, WINDOWS MOBILE 7 (including new NOKIA/MICROSOFT devices) or ANDROID operating system phone, etc.

Figure 3:
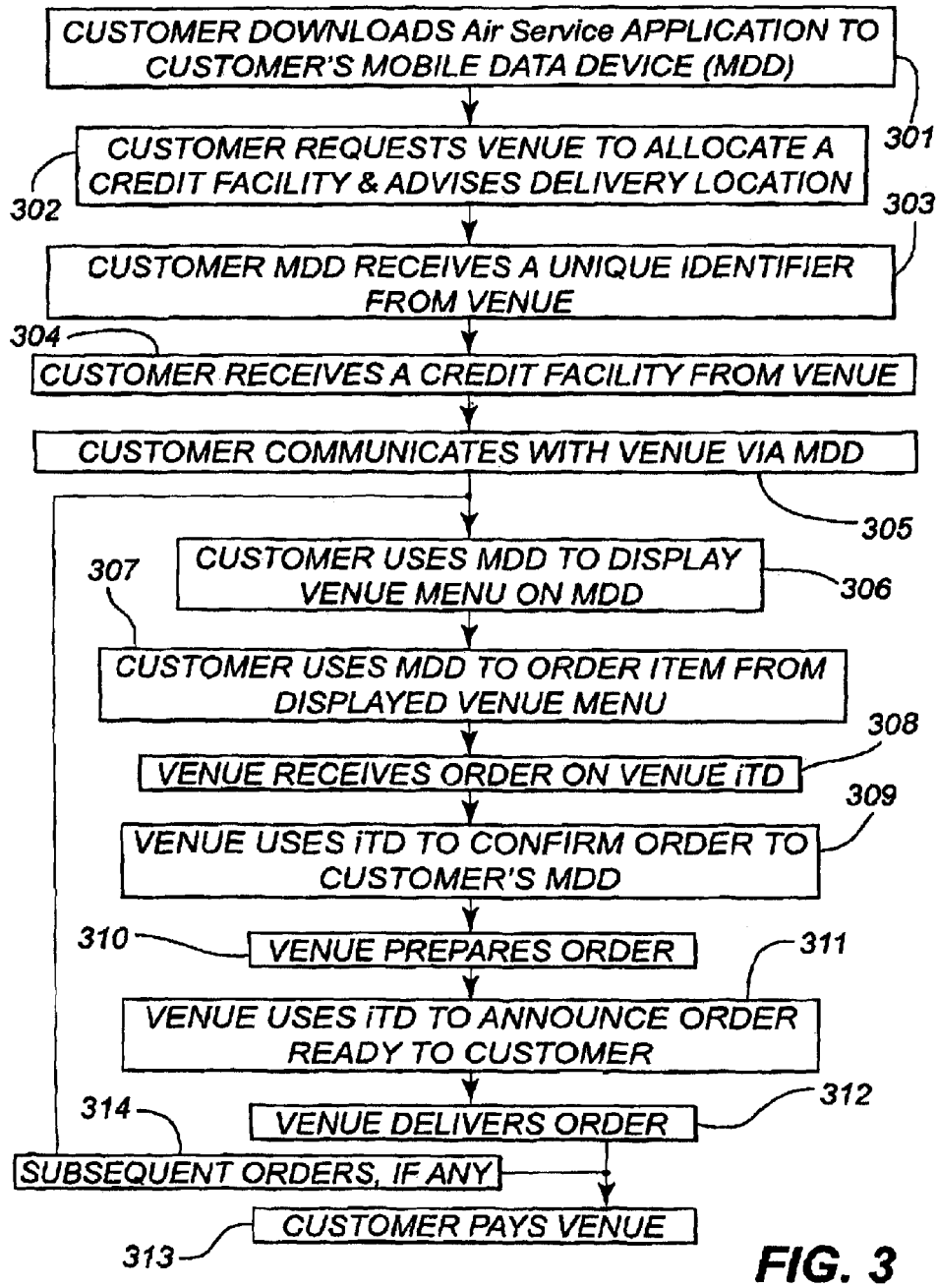
FIG. 3 is a flow chart illustrating a series of steps undertaken by a customer and to which the venue responds.

Utilizing their mobile data devices 18, the customers 15, 16 are able, as indicated at step 301 of FIG. 3, to download from the vendor via the internet, a mobile data device application which preferably is also known by the trade mark AIRSERVICE. Once this application is downloaded, the customers 15, 16 are then able, as indicated at step 302, to request the venue 1 that they open a credit facility. This is preferably done by the customer sending a "connection request" via his mobile data device 18 to the venue's iPAD. Normally this involves leaving a credit card, or credit card details, with the venue. Once this happens, the venue 1 then not only allocates a credit facility (step 205) but also allocates a customer unique account number or a customer identification code or PIN (step 204) which is downloaded to the customer's mobile data device 18. The customer also indicates his intended location which may be a room number of a hotel, or a table number of a restaurant, or similar.

Once these preliminary activities have been undertaken, any of the customers 15, 16 are able to use their mobile data device 18 to communicate with the venue 1 via the Internet and, as indicated in step 306, utilize the mobile data device 18 to display the venue menu.

The customer is then able to order one or more items from the displayed venue menu. This is indicated at step 307.

As indicated at step 308, the venue 1 receives the order on the venue iPAD type device 13 and then as indicated at step 309 this device then confirms the customer order to the customer's mobile data device 18 Such a confirmatory message can also be used as a "Push Notification" to explain daily specials or otherwise solicit a further order.

Then venue 1 prepares the necessary food and beverage order (as indicated at step 310) and then uses the iTD 13 to announce that the order is ready to the customer as indicated at step 311. Then as indicated in step 312 the venue delivers the order.

Subsequent orders can be initiated as indicated at step 314 which then initiates a loop resulting in the delivery of the subsequent order or orders.

The final step 313 is that at the conclusion of the meal or drinks session, or when the customer wishes to "close his account", the customer either electronically or in person requests the closing of the credit facility. The customer then pays the venue using the venue's regular payment system and the venue closes the credit facility.

A particular advantage of the present invention is that the customers 15, 16 etc all already have a mobile data device 18 and so the venue 1 does not have to provide any electronic equipment to its customers. In addition, customers are able to make repeated orders but only pay once. Furthermore, the customers are able to use their mobile data devices at any venue which subscribes to the AIRSERVICE system via the vendor. Thus it is only necessary for the customer 15, 16 etc. to download the AIRSERVICE application once, and have a data connection to the interact either via 3G, 4G, or WiFi etc. Each venue will have a different menu and will upload their own header, background and the like which will carry the venue's trade marks, logos and brands. Consequently, most venues in the system will look completely dissimilar to the customer, even though the same computer code is being utilized.

In addition, because the venue utilizes its regular or an existing payment system, it is not necessary for there to be any provision of credit card details over the internet between the AIRSERVICE provider (or vendor) and the various customers. This considerably simplifies the interrelationship between the AIRSERVICE provider and the customers. Furthermore, all customers have their food, drinks, etc delivered within the venue premises and so the venue does not need to provide a takeaway delivery system.

The foregoing describes only one embodiment of the present invention and modifications, obvious to those skilled in the arts, can be made thereto without departing from the scope of the present invention.

For example, a customer can specify a spend and/or a time limit to the credit facility. The customer's MDD can display a continuous running total of the credit facility so that the customer always knows his level of indebtedness. The MDD app can be set to not allow further ordering after a set spend or time limit.

Furthermore, utilising the GPS facility already inherent in the customer's MDD and a knowledge of the venue's GPS coordinates, if the customer should inadvertently leave the venue with a credit facility still open, after a predetermined distance such as 100 meters or 500 meters, the MDD alerts the customer to the fact that the credit facility is still open. This enables a valuable credit card, for example, to be retrieved.

Pre-ordering is also possible so that a bottle of champagne, for example, can be pre-ordered to be delivered at the predetermined location at a specified future time.

In relation to the venue, the iPAD operator can suspend service to, for example, apparently inebriated customers, for some limited time. The iPAD operator can also unilaterally close the credit facility as a way of refusing service to an unruly customer, for example. The customer's delivery location can also be changed to accommodate changes in the customer's location.

In relation to the webpage, the venue is able to customise their menu(s) with uploaded photographs, logos, etc. The menu(s) can be changed for certain times of day e.g. breakfast, lunch and dinner menus or a functions menu which is limited to a specific location. In addition, the venue can include images such as photographs of various meal items in the menu. Consequently, the menu functions not only as a menu but as an advertising brochure for the venue which is a much more attractive display than a conventional menu.

Furthermore, as the users of AIRSERVICE become more prolific, even to the extent of being ubiquitous, so the venue can completely do away with a printed menu (or severely curtail the number of menus printed).

Another advantage to the venue is the ease of setting up, and if necessary modifying, the menu since this is done over the Internet.

The venue is also able to send "push notification messages" regarding specials and/or time information such as last orders to all customers, or to customers in a staggered sequence of locations. This can be accomplished either from the iPAD or from the webpage. The venue operator is also able to track various items of information such as turnover, sales of specific items by location and/or time, and the like.

In a still further modification, the venue instead of providing delivery of ordered meals, drinks, etc can send a message to the customer's MDD to say "please collect your order" and display on the MDD's screen an indicium (such as a number) which identifies the order to the venue's dispensing staff.

A reduced utility service is also available, particularly, but not exclusively, as a new venue sales promotion device, where venue menus are available for display on customer's MDD's but no orders are able to be taken. Instead, orders are given and paid for in the conventional way. This enables the customer's MDD screen to function as a vivid "printed" menu for such venues.

Once multiple venues become enabled to use the AIRSERVICE facility, customers can use their mobile data device to search for such enabled venues in their local vicinity. Such venues can then have their menus considered and browsed before the customer actually visits the physical location of the venue.

The term "comprising" (and its grammatical variations) as used herein is used in the inclusive sense of "including" or "having" and not in the exclusive sense of "consisting only of".

The invention claimed is:

1. A method of placing orders at a retail venue including a venue data device and having a plurality of customers each of whom has a mobile data device, said method comprising the steps of:
   (i) said venue data device uploading a venue menu to an internet site;
   (ii) downloading an order application from said site to the mobile data devices of said customers;
   (iii) said venue data device allocating a customer unique customer identification code to each said customer and storing said code in said mobile data device of the corresponding customer, and
   (iv) displaying the venue menu on said mobile data device to allow a customer allocated a corresponding one of said customer unique customer identification codes to access said menu via his mobile data device to order one or more items from said menu.

2. The method as claimed in claim 1 wherein said venue has a plurality of venue locations at any one of which the customer may be located, and said method comprising the further step of:
   (v) said customer identifying his location whilst ordering.

3. The method as claimed in claim 2 including the further step of:
   (vi) delivering a completed order to the location identified by the customer in step (v).

4. The method as claimed in claim 3 and including the further step of
   (vii) said mobile data device of said customer on completion of said order receiving an acknowledgement from said venue data device.

5. The method as claimed in claim 4 and including the further step of:
   (viii) said venue data device issuing to the customer's mobile data device a message indicating that a previously placed order is about to be delivered.

6. The method as claimed in claim 5 wherein at least one of steps (i)-(viii) is performed using a smart phone.

7. A system for placing orders at a retail venue having a plurality of customers each of whom has a mobile data device, said system comprising
   a venue data device of said retail venue that is programmed to perform the following steps:
   to upload a venue menu to an Internet site,
   to allocate a customer identification code allocated to each said customer and
   to store the customer identification code in said mobile data device of the corresponding customer; and
   an order application downloaded from said Internet site to the mobile data device; said order application being programmed to display the venue menu to allow a customer to utilize the mobile data device to access said venue menu and the stored customer identification code and to order one or more items from said venue menu.

8. The system as claimed in claim 7 wherein said venue has a plurality of venue locations at any one of which the customer may be located, and said order application permits the customer to identify his venue location whilst ordering.

9. The system as claimed in claim 8 wherein a completed order is delivered to the location of the customer.

10. The system as claimed in claim 9 wherein said order application is configured such that upon completion of an order, the customer receives on his mobile data device an acknowledgment from said venue data device.

11. The system as claimed in claim 10 wherein said order application is configured such that said venue data device issues to the ordering customer's mobile data device a message indicating that a previously placed order is about to be delivered.

12. The system as claimed in claim 11 wherein at least one of said mobile data devices and said venue data device comprises a smart phone.

13. The system as claimed in claim 8 wherein said venue menu has both a menu content and a menu appearance, and each venue location will display a venue unique menu appearance to the customer if the customer identifies their venue location.

14. The system as claimed in claim 7, wherein said venue data device is to issue to the customer's mobile data device a message indicating that a previously placed order is about to be delivered.

15. The system as claimed in claim 7, wherein at least one of said mobile data devices and said venue data device comprises a smart phone.

16. The system as claimed in claim 7, wherein said application is configured such that upon completion of an order, a customer receives on his mobile data device an acknowledgment from said venue data device.

17. The method as claimed in claim 2 wherein step (i) comprises uploading a venue menu having both a menu content and a menu appearance, wherein the menu appearance is unique to the venue location that is identified by the customer during step (v).

18. The method as claimed in claim 1 and including the further step of:
    (v) said venue data device issuing to the customer's mobile data device a message indicating that a previously placed order is about to be delivered.

19. The method as claimed in claim 1, wherein at least one of steps (i)-(iv) is performed using a smart phone.

20. The method as claimed in claim 1 and including the further step of:
    (v) receiving an acknowledgement on said mobile data device from said venue data device on completion of said order.

* * * * *